United States Patent [19]

Petty

[11] 3,976,602

[45] Aug. 24, 1976

[54] HIGHLY UNSATURATED POLYETHERS

[75] Inventor: Walter L. Petty, Oakland, Calif.

[73] Assignee: Shell Oil Company, Houston, Tex.

[22] Filed: Dec. 31, 1964

[21] Appl. No.: 423,646

[52] U.S. Cl. ............................ 260/2 EP; 260/615 B
[51] Int. Cl. ...................... C08g 30/02; C07c 43/16
[58] Field of Search .......... 149/109; 260/83.5, 85.7, 260/615 B, 348, 2 EP, 2 OX, 348.6

[56] References Cited

UNITED STATES PATENTS

| | | | |
|---|---|---|---|
| 2,445,379 | 7/1948 | Young et al. | 260/615 X |
| 3,102,893 | 9/1963 | Gaertner | 260/348 |
| 3,108,432 | 10/1963 | Balaceanu et al. | 149/109 X |
| 3,118,000 | 1/1964 | Dupre et al. | 260/584 |
| 3,141,908 | 7/1964 | Calfee | 260/615 |
| 3,149,168 | 9/1964 | Karlan et al. | 260/615 |
| 3,151,130 | 9/1964 | Phillips et al. | 260/348 |
| 3,152,187 | 10/1964 | Coyne et al. | 260/584 |
| 3,159,655 | 12/1964 | Tousignant | 260/348 |
| 3,165,556 | 1/1965 | Shachat et al. | 260/615 |
| 3,206,482 | 9/1965 | Bright | 260/2 EP X |
| 3,232,988 | 1/1966 | Sexsmith et al. | 260/2 EP X |
| 3,799,947 | 3/1974 | Gurgiolo et al. | 260/348 R |

OTHER PUBLICATIONS

Ushakov et al., Chem. Abs., vol. 45, (1951), p. 5608.

Primary Examiner—Leland A. Sebastian

EXEMPLARY CLAIM

1. A highly unsaturated polyether having repeating units having the structure

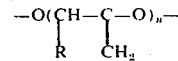

wherein R is a member of the group consisting of hydrogen and alkyl groups, and $n$ is an integer greater than 2.

4 Claims, No Drawings

HIGHLY UNSATURATED POLYETHERS

This invention relates to new highly unsaturated polyethers and their preparation. More particularly, the invention relates to new polyunsaturated polyethers which are particularly adapted for use in preparing tetrafluorohydrazine adducts useful as binders for solid propellants, and to a new method for preparing the polyethers from polyepihalohydrins.

Specifically, the invention provides new and particularly useful highly unsaturated polyethers having repeating units possessing the unique configuration

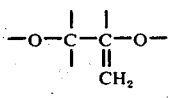

which configuration endows the polymer with many unusual properties. The invention further provides a new and highly efficient process for preparing the above-noted products which comprises treating a polyepihalohydrin, such as a polyepichlorohydrin preferably having a molecular weight of at least 1000, to vigorous dehydrohalogenating conditions as noted hereinafter to effect a removal of HCl and form the desired vinyl ether type groups.

As a special embodiment, the invention provides new highly unsaturated polyethers as described above possessing hydroxy-substituted terminal groups, which groups provide a convenient way for cross-linking and curing the polymeric polyethers.

The invention further provides new adducts of the above-described highly unsaturated polyethers which are outstanding binder materials for high energy solid propellants, said new adducts being prepared by reacting the above-described polyethers with tetrafluorohydrazine so as to effect an addition of the N₂F₄ at the double bonds of the polyether to form units having the structure:

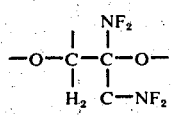

The use of these tetrafluorohydrazine adducts containing terminal OH groups with curing agents such as polyisocyanates to form elastomeric binders for solid propellants is also claimed.

There is a growing need in industry for polymeric materials which are highly reactive and can be used to form cross-linked materials or further reacted to form derivatives of desired properties. Vinyl ether type linkages have proved to be highly reactive, but to the present polymers have never been obtained where groups of this type have been partly embodied in the main polymer chain.

It is an object of the invention, therefore, to provide a new class of highly unsaturated polyethers and a method for their preparation. It is a further object to provide polyfunctional highly unsaturated polyethers which have many new and unusual properties. It is a further object to provide new unsaturated polyethers than can be further reacted to form valuable derivatives. It is a further object to provide new unsaturated polyethers that can be cross-linked to form insoluble, infusible products. It is a further object to provide new unsaturated polyethers that can be used to form valuable tetrafluorohydrazine adducts. It is a further object to provide new hydroxy-substituted tetrafluorohydrazine adducts which can be easily cured to form insoluble castings. It is a further object to provide new adducts which can be cured to form adducts having good elongation and tensile strength. It is a further object to provide a new and highly efficient process for preparing highly unsaturated polyethers from polyepihalohydrins. These and other objects of the invention will be apparent from the following detailed description thereof.

It has now been discovered that these and other objects may be accomplished by the new products of the present invention comprising highly unsaturated polyethers having repeating units of the structure

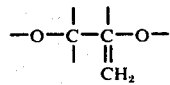

which structure endows the polymers with unusual properties. These new polyethers are prepared by a new and highly efficient process of reacting a polyepihalohydrin in a solvent and a dehydrohalogenating agents, such as, for example, sodium methoxide, and then recovering the desired polyether from the resulting mixture. The products prepared in this manner have the unique characteristic of having an active ethylenic group attached directly to an oxygen atom and the aliphatic carbon atom. As a result these new polyethers can be used for many valuable applications. They can be used, for example, as plasticizers and stabilizers and as lubricants and additives for lubricating oils. These new polyethers can also be polymerized alone or in combination with other ethylenically unsaturated compounds, such as the acrylates, styrene, butadiene, isoprene, acrylonitrile, vinyl chloride, vinyl ethers, alkenyl ketones and the like, when heated with catalysts, such as peroxides. These new unsaturated polyethers are highly reactive and readily combine with many reactants, such as halogens, mercaptans, amines, etc. to form valuable derivatives. They are particularly valuable as they react with N₂F₄ to form the new tetrafluorohydrazine adducts. These special adducts having a high NF₂/C content and terminal OH groups can be easily cured as by further reaction with polyisocyanates to form cured resins. These materials possess the highly desired characteristics of good elongation and tensile strength which have been missing in many of the earlier formed nitrogen-containing polymers.

The polyepihalohydrins used to form the new polyhydroxy-substituted polyunsaturated polyethers are those obtained by polymerizing a "halo-epoxy-substituted alkane" in the presence of the hereinafter described acidic catalysts. As used herein this expression refers to those alkanes having a vic-epoxy group, i.e., a

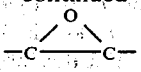

group, attached directly to a halogen bearing carbon atom, such as, for example, epichlorohydrin, epibromohydrin, 1,4-dichloro-2,3-epoxybutane, 1-chloro-2,3-epoxypentane and the like. Especially preferred are the halo-epoxy-substituted alkanes containing no more than 12 carbon atoms, and preferably from 3 to 8 carbon atoms.

The preferred polyepihalohydrins are the hydroxy terminated polyepichlorohydrins, i.e., those wherein the terminal units contain 1 or more OH groups. These are preferably prepared by polymerizing the epihalohydrins in the presence of a controlled amount of a polyhydroxy-containing material, such as water, polyhydric alcohols or phenols and the like, to form an epihalohydrin polymer. The catalysts used in the polymerization reaction include, among others, the acidic materials, such as hydrofluoric, sulfuric, phosphoric, and hydroiodic acids, and also such "Lewis acids" as tin tetrachloride, and boron trifluoride complexes, especially the ether complex. The concentration of the catalyst employed will vary, depending upon the catalyst, the solvent, the reaction temperature, and the rate of polymerization desired. In general, the catalyst will be employed in amounts varying from about 0.1% to about 5% by weight of the reactants. Larger or smaller amounts of catalyst, such as $BF_3$-complex, such as $BF_3$-ethyl etherate may be needed to obtain the higher molecular weight polymers and are noted hereinafter.

As noted, the polymerization is conducted in the presence of a polyhydroxy-containing material, such as water, polyhydric alcohols, polyhydric phenols and the like, such as glycerol, glycerol monochlorohydrin, hexanetriol, monomethyl glycerol ether, bis-phenol-A, resorcinol and the like. As to the ratio of halo-epoxy substituted alkane and OH containing material employed in the reaction, there should be at least four moles of the halo-epoxy-substituted alkane and preferably from 10 to 60 moles of the halo-epoxy-substituted alkane per mol of OH-containing material. The exact ratio selected will depend on the molecular weight of the polymer desired, the higher ratios giving the higher molecular weights. Polymers having particularly outstanding properties are those wherein the haloepoxyalkane and the OH-containing material are employed in ratios varying from 10:1 to 60:1.

In mixing the components together, the halo-epoxy-substituted alkane and OH-containing material and catalyst may be combined all at the beginning or one or more of the components maybe added separately at one time or throughout the course of the reaction. Best results are generally obtained when the halo-epoxy-substituted alkanes are added in portions throughout the course of the reaction.

To obtain the higher molecular weight polymers, such as those resulting from the use of ratios of 10:1 or higher, it is highly desirable to also add portions of catalyst in the latter part of the reaction. This is due to the fact that after a certain amount of polymer formation, the catalyst sometimes becomes inactive and further addition of catalyst should be employed in order to continue to build up the molecular weight. The amount added in the second stage should be approximately the same as that added at the beginning, e.g., 0.1 to 5% by weight.

The temperatures used in the polymerization may be varied over a wide range. In general, the temperature employed may vary from about 80°C to 150°C, and more preferably, from 0°C to 100°C.

The heating is continued until substantially all of the halo-epoxy-substituted alkane has polymerized. In general, this will require from about 1 to 25 hours, depending on catalyst and temperature.

The preparation of three of the polyepichlorohydrins by the above process using glycerol or glycerol alpha-monochlorohydrin as the initiating agent are illustrated below:

Polyepichlorohydrin A 2.2 parts of $BF_3$-ethyletherate was added to 22.5 parts of glycerol and the mixture heated to 42°C. 1000 Parts of epichlorohydrin dissolved in 1000 parts of methylene chloride was then added slowly to the stirred mixture. Supplemental additions of catalyst (1.1 and 0.7 parts, respectively) were made after 50% and 80% of the epichlorohydrin had been added. The addition of epichlorohydrin took a total of about three hours and the mixture was stirred for an additional 18 hours at 45°C. Removal of catalyst with water and distillation of solvent left a viscous liquid polymer having approximately the following structure wherein $m + n + p$ is equal to 17:

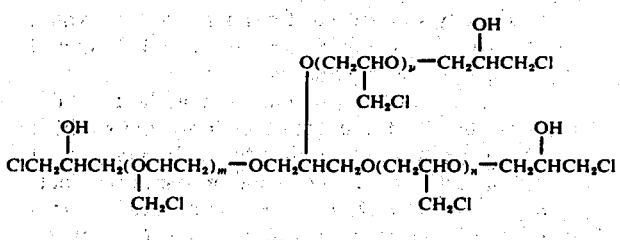

Polyepichlorohydrin B 2.9 Parts of $BF_3$-ethyletherate was added to 17.6 parts of glycerol alpha-monochlorohydrin and the mixture surrounded by a water bath at room temperature. 1000 Parts of epichlorohydrin dissolved in 1000 parts of methylene chloride was then added slowly to the stirred mixture. When half of the epichlorohydrin had been added an additional 2.9 parts of the catalyst was added. The addition of epichlorohydrin took a total of about 4 hours, and the mixture was stirred for an additional 4 hours at room temperature. Removal of catalyst with water and distillation of solvent left a viscous liquid polymer having approximately the following structure wherein $n$ is 18:

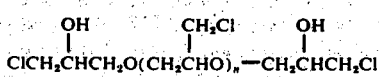

Polyepichlorohydrin C

100 Parts of polyepichlorohydrin B dissolved in 500 parts of methylene chloride was reacted with a solution of 25 parts of potassium hydroxide in 79 parts of methanol for 3 hours at room temperature. After removing the methanol and inorganic salts by washing with water and then drying it, the solution of polymer was added slowly to a mixture of 1.6 parts of BF$_3$-ethyl etherate and 300 parts of acetone during 1.5 hours. The mixture was stirred for an additional 16 hours, and after neutralization of the catalyst and removal of solvent the resulting product was a viscous liquid polymer having approximately the following structure wherein $n$ is 18:

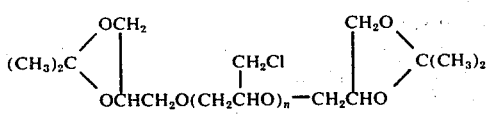

The polyepihalohydrins used in the process of the invention are those possessing a plurality of groups as

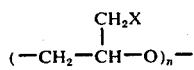

wherein X is halogen and preferably chlorine or bromine and $n$ is an integer preferably between 10 and 60. Particularly preferred are those hydroxy-containing polyepihalohydrins prepared in the presence of a polyhydroxy-containing initiating material. These preferred materials may be represented by the structure

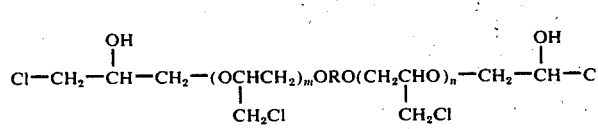

wherein $m$ and $n$ are integers preferably 4 to 30, R is the residue of the dihydric initiating material, and those of the structure

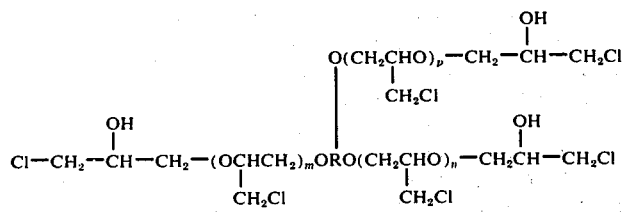

wherein $m$, $n$ and $p$ are integers of 0 to 100 and preferably 4 to 30, and R is the residue of the trihydric initiating material.

The polymers formed by the above method using water or glycerol monochlorohydrin will comprise halo-substituted polyhydroxy-substituted alkanes, which in the case of epichlorohydrin will have the following structure:

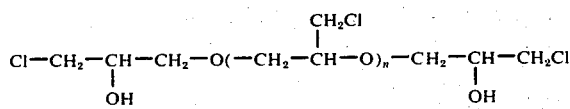

wherein $n$ is an integer of 0 to 100 and preferably 8 to 60. The polymers will be viscous liquids, the viscosity depending upon the number assigned to $n$ in the above formula.

The new highly unsaturated polyethers are prepared from the above-described polyepihalohydrins by treating the polyepihalohydrin with dehydrohalogenating agents under vigorous conditions. During this reaction, HCl is removed to form the units

Numerous methods can be utilized to effect the vigorous dehydrohalogenating conditions. These include use of strong bases, high temperatures or different types of solvents or combinations of two or more of these techniques. The dehydrohalogenation may be effected, for example, by heating the polyepihalohydrin with sodium methoxide in methanol under reflux, by heating the polyepihalohydrin with sodium ethoxide in ethanol under reflux, by treating with potassium tert-butoxide in tertiary butanol, by treating the polyepihalohydrin with potassium tert-butoxide in benzene or toluene at or near room temperature.

In order to effect the dehydrohalogenation and still retain hydroxyl group or groups of epoxy groups in the terminal units so that they may be present for subsequent reaction, it has been found most helpful to effect the reaction in the presence of dimethyl sulfoxide as solvent and dehydrohalogenating agents, such as metal alkoxides as sodium methoxide, potassium tert-butoxide and the like.

Another technique to preserve hydroxyl functionality in the end groups during dehydrochlorination is to convert these terminal units of the polyepichlorohydrin to dioxolane groups and then after the dehydrochlorination and addition reactions hydrolyze the dioxolane groups.

The amount of the dehydrohalogenating agent used may vary over a considerable range, depending on the completeness of dehydrohalogenation desired. The polyepihalohydrin should be reacted with an amount of the agent material which is at least equivalent to the hydrogen halide content of that polyepihalohydrin if complete dehydrohalogenation is desired. Excess agent is usually desired. Less than the equivalent amount of the agent material may be used if all of the halogen atoms are not to be eliminated or displaced.

The amount of the dimethyl sulfoxide solvent to be utilized may vary over a wide range and depends on the viscosity of the reaction mixture. Preferred amounts vary from about two times to about ten times the weight of the polyepihalohydrin to be treated.

In most cases, the dehydrohalogenation reaction may be accomplished at temperatures which preferably range from about 0°C to 150°C and still more preferably 20°C to 80°C.

At the end of the reaction period, the reaction mixture containing polymer, inorganic salt and solvent is then preferably quenched with water, washed, dried and freed of solvent under vacuum.

The unsaturated polyethers of the invention will be viscous liquids to waxy solids having a high degree of unsaturation and preferably at least one OH group in the terminal units. The polymer preferably has an unsaturation of at least 1.2 equivalents per 100g. The unsaturated polyethers are soluble in many organic solvents, such as halogenated solvents, ketones, esters and aromatic hydrocarbons, and are compatible with many synthetic oils and resins.

A preferred group of the unsaturated polyethers of the invention comprise the polyhydroxy-substituted highly unsaturated polyethers of the formula

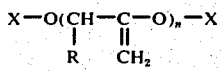

wherein X is a hydroxy-substituted alkyl radical containing from 3 to 8 carbon atoms, and R is a member of the group consisting of hydrogen and alkyl radicals, and $n$ is an integer greater than 2.

Another preferred group of the polymeric polyhydroxy-substituted highly unsaturated polyethers are those of the formula

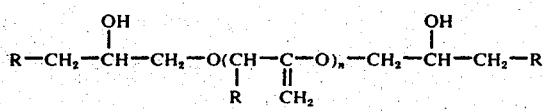

wherein R is a member of the group consisting of hydrogen and alkyl radicals and $n$ is an integer between 2 and 60.

The new unsaturated polyethers find many important uses in industry. They may be used, for example, as plasticizers, stabilizers, lubricants and additives for lubricating oils, greases and the like, and as impregnating agents or treating agents for textiles, paper, leather, wood and the like, and as additives for paints, lacquers and varnishes.

The new unsaturated polyethers can also be polymerized alone or in combination with other ethylenically unsaturated compounds, such as, for example, those containing a polymerizable >C=C< group or CH$_2$=C< group, as styrene, alpha-methylstyrene, p-chlorostyrene, butadiene, isoprene, chloroprene, ethylene, propylene, butylene, isobutylene, acrylonitrile, methacrylonitrile, acrolein, vinyl chloride, vinylidene chloride, methyl acrylate, ethyl acrylate, butyl acrylate, methyl methacrylate, butyl methacrylate, vinyl acetate, divinylbenzene, diallyl phthalate, divinyl succinate, diallyl adipate, diacrylate ester of ethylene glycol, vinyl pyridine, vinyl pyrrolidone, glycidyl methacrylate, vinyl cyclohexene monoepoxide and the like, and mixtures thereof. These compounds are preferably utilized in amounts varying from about 0.1% to 99% by weight of the mixture, and more preferably from 1 to 75% of the combined mixture of the monomers. The polymerization can be effected by merely heating the monomer or mixture of monomers in bulk, solvent or aqueous emulsion systems with peroxide catalysts, redox polymerization catalyst systems or even at times with the Friedel-Craft type catalysts. The resulting polymers find many uses in the formation of plastic articles, coatings and the like.

The new unsaturated polyethers containing the OH groups may also be used in the formation of cross-linkable polyurethanes, cross linkable polyesters and the like, for use in making moldings, laminated products, coatings and the like.

The new unsaturated polyethers may also be used to make new and valuable derivatives either by further reacting through the active ethylenic groups with components, such as halogens, amines, mercaptans and the like, or by reacting through the OH groups to form new esters, ethers and urethanes.

The new functional polyunsaturated polymers are particularly suited for use in the preparation of binders for high energy solid propellants. This is preferably accomplished by reacting the said polymers with N$_2$F$_4$ so as to obtain the maximum conversion of double bonds to vicinal bis(difluorlamino) groups. The usual and preferred method comprises adding N$_2$F$_4$ gas to a reactor containing the functional polyunsaturated polymer in a suitable solvent at elevated temperatures and pressures.

Another suitable method comprises injecting the functional polyunsaturated polymer into a reactor which is already under N$_2$F$_4$ pressure, say 500 psi. In general, the reactors inner surfaces are constructed of either glass or steel, although other materials may be employed if desired. Using this method, the polymer feed may be introduced into the vapor space as by spraying upon the wall or may be introduced beneath a stirred solvent-N$_2$F$_4$ layer (feed injection).

The temperatures employed normally range from about 40°C to about 120°C with temperatures lower and higher sometimes used. The preferred temperature range is from about 60°C to about 100°C.

In general, pressures above 100 psi are required with pressures of 500 psi and above generally being preferred in order to increase reaction rates.

Reaction times may vary from about an hour to about 20 hours or more depending on reaction temperature and pressure. The reaction is essentially complete after 2 or 3 hours when carried out at 80°C and 500 psig in acetone solvent.

Suitable solvents or diluents include, among others, carbonyl compounds such as ketones, as, for example, acetone and methyl ethyl ketone; esters, as, for example, methyl acetate; ethyl acetate and diethyl oxalate; ethers, as, for example, diethyl ether and tetrahydrofuran; aromatic hydrocarbons, as, for example, benzene and toluene; and halogenated solvents, as, for example, methylene chloride and ethylene chloride and mixtures of these various type solvents. In general, the selection of a particular solvent is based upon a number of factors such as the solubility of N$_2$F$_4$, the ease of removal of the solvent from the product, etc. The major factor is the ability of the solvent to yield a high quality product. Acetone has been found to be an especially good solvent for the reaction of N$_2$F$_4$ with this unsaturated polymer, and, under the proper conditions, little degradation or side-reactions occur. The dilution ratio, i.e., the ratio of the unsaturated polymer to solvent, may range from about 1:1 to about 1:40 with from about 1:5 to about 1:20 being generally preferred.

Very suitable solid propellant binders are obtained when these $NF_2$ adducts are reacted (cured) with polyisocyanates such as, for example, any polyfunctional compound of the general formula $R(NCS)_{n+1}$ which may be aliphatic, cycloaliphatic or aromatic, wherein $n$ is any integer, X is oxygen or sulfur and R is a polyvalent organic radical. Examples of isocyanates are polymethylene diisocyanates, such as ethylene diisocyanate, trimethylene diisocyanate, tetramethylene diisocyanate, pentamethylene diisocyanate; cycloalkylene diisocyanates, such as cyclopentylene-1,3-diisocyanate, and cyclohexylene-1,4-diisocyanate; aromatic diisocyanates, such as metaphenylene diisocyanate, paraphenylene diisocyanate, 1-methyl-2,4-phenylene diisocyanate, naphthylene-1,4-diisocyanate, diphenylene-4,4'-diisocyanate or p-phenylene diisothiocyanate. A difunctional organic isocyanate is preferred with aromatic diisocyanates, for example a tolylene diisocyanate or isomeric mixtures thereof are especially preferred.

Other suitable curing agents include the epoxides, such as, for example, those organic materials which have more than one vic-epoxy group, i.e., more than one

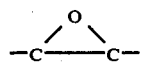

group, which group may be in a terminal position, i.e., a

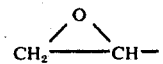

group or in an internal position, i.e., a

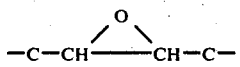

group. The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides, include, among others, 1,4-bis(2,3-epoxypropoxy)benzene, 1,3-bis(2,3-epoxypropoxy) benzene, 4,4'-bis(2,3-epoxypropoxy)-diphenyl ether, 1,8-bis(2,3-epoxypropoxy)-octane, 1,4-bis(2,3-epoxypropoxy)cyclohexane, 4,4'-bis(2-hydroxy-3,4-epoxybutoxy)diphenyl dimethylmethane, 1,3-bis(4,5-epoxypentoxy)-5-chloro-benzene, 1,4-bis(3,4-epoxybutoxy)-2-chlorocyclohexane, 1,3-bis(2-hydroxy-3,4-epoxybutoxy)benzene,1,4-bis(2-hydroxy-4,5-epoxypentoxy)benzene.

Other examples include the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl) butane, 4,4'-dihydrobenzophenone, bis(4-hydroxyphenyl)ethane, 2,2-bis(4-hydroxyphenyl)pentane and 1,5-dihydroxynaphthalene.

Further curing agents that are suitable under certain circumstances are the anhydrides, such as maleic anhydride, succinic anhydride and phthalic anhydride and the polyacyl halides such as oxalyl chloride and succinyl chloride.

In general, in forming a binder for a solid propellant, the $NF_2$ adduct and curing agent are mixed with the solid oxidizing agent(s) and packed or cast under vacuum in an appropriate rocket motor with a removable center core. Curing is then caused by heating at say 60°C for, say several hours to several days. Catalysts such as dibutyltin diacetate and $BF_3$-etherate may be employed when isocyanate and epoxide curing agents are used, respectively.

It is desirable to use an amount of binder that when said binder is reacted with the other components, will give adequate physical properties along with the highest impulse possible. In general, this is approximately 25% by weight of binder, but may be as little as about 10%.

It may also be desirable to include secondary energetic plasticizers in combination with plasticizers, such as dioctyl phthalate, and the like.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise indicated, parts disclosed in the examples are parts by weight.

EXAMPLE I

This example illustrates the preparation of a hydroxy-substituted polyunsaturated polyether from polyepichlorohydrin A described above.

100 Parts of polyepichlorohydrin A was combined with 700 parts of dimethyl sulfoxide, and 100 parts of sodium methoxide was added to the stirred mixture during 1 hour while maintaining the reaction temperature at 25°C with a cooling bath. The mixture was stirred in a closed reactor for an additional 22 hours. The resulting product made up of a mixture of polymer, inorganic salt and dimethyl sulfoxide was quenched in a large volume of water. The polymer was then taken up in methylene chloride, washed with water, dried and precipitated by pouring into methanol. The powdered product was filtered, rinsed and stripped of solvent. There resulted 33 parts of a fine white powdered polymer having repeating units of

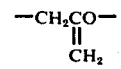

Analysis: C, 62.3%; H, 7.6%; unsaturation by hydrogenation, 1.46 eq/100g; molecular weight, 2400; hydroxyl, 0.11 eq/100g.

The polymer was soluble in methylene chloride, methylacetate and warm acetone.

EXAMPLE II

This example illustrates the preparation of a polyunsaturated polyether from polyepichlorohydrin C described above, in which the terminal functions are protected with substituted dioxolane groups.

100 Parts of polyepichlorohydrin C was combined with 700 parts of dimethyl sulfoxide, and 75 parts of sodium methoxide was added to the stirred mixture during two minutes while maintaining the reaction temperature at 25°C with a cooling bath. The mixture was stirred in a closed reactor for an additional 23 hours. The resulting product was quenched in a large volume of water. The polymer was then taken up in methylene chloride, washed with water, dried and precipitated by pouring into methanol. The powdered product was filtered, rinsed and stripped of solvent. There resulted 36 parts of a fine white powdered polymer having repeating units of

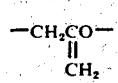

and in which the terminal units were in the form of substituted dioxolanes:

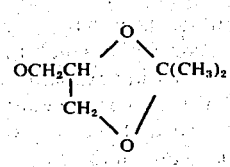

Analysis: C, 60.7%; H, 7.2%; unsaturation by hydrogenation, 1.27 eq/100g; molecular weight 2140.

The polymer was soluble in methylene chloride, methylacetate and warm acetone.

EXAMPLE III

This example illustrates the use of a medium other than dimethyl sulfoxide for the dehydrochlorination.

100 Parts of polyepichlorohydrin (similar to C) was combined with 1000 parts of methylene chloride, and 250 parts of potassium t-butoxide was added to the stirred mixture during 15 minutes while maintaining the reaction temperature at 25°C with a cooling bath. The mixture was stirred in a closed reactor for an additional 70 hours. The resulting product was washed with large volumes of water, dried, concentrated and precipitated by pouring into petroleum ether. The waxy product, 22 parts, had the following analysis:

C, 64.5%; H, 7.8:, unsaturation by hydrogenation, 1.43 eq/100g; molecular weight, 1860.

EXAMPLE IV

This example illustrates the preparation of a high energy solid propellant binder via addition of tetrafluorohydrazine to the unsaturated polymer described in Example I.

100 Parts of the unsaturated polymer described in Example I were combined with 740 parts of acetone and the mixture was stirred in a closed reactor, heated at 80°C and treated with tetrafluorohydrazine at 500 psig for 3.5 hours. This reaction was repeated twice more and the combined products were washed, dried, precipitated by pouring into petroleum ether and stripped of solvent. The viscous yellow product, 240 parts, had the following analysis:

C,25.7%; H, 2.8%; N,15.2%, F, 40.5%; hydroxyl, 0.043 eq/100g; molecular weight, 5500.

The product was soluble in acetone and in methylene chloride.

EXAMPLE V

This example illustrates the preparation of a high energy solid propellant binder via addition of tetrafluorohydrazine to the unsaturated polymer described in Example II.

A stirred reactor containing 60 parts of acetone was heated to 80°C and pressured to 500 psig with tetrafluorohydrazine. Into this mixture was pumped a solution of 100 parts of the unsaturated polymer described in Example II dissolved in 240 parts of methyl acetate and 270 parts of methylene chloride during 37 minutes, maintaining the reaction conditions of 80°C and 500 psig of $N_2F_4$. The reaction was continued for an additional 2.5 hours. The product was stripped of solvent and the terminal dioxolane groups were hydrolyzed off under acidic conditions. There resulted 210 parts of a viscous yellow polymer having repeating units of

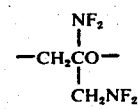

and in which the terminal units were in the form of:

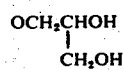

Analysis: C, 26.3%; H, 3.0%; N,13.9%; F, 40.1%; hydroxyl, 0.024 eq/100g; molecular weight, 3800.

EXAMPLE VI

This example illustrates the preparation of a rubbery polyurethane binder from the high energy polymer described in Example IV.

100 Parts of the difluoramino polymer described in Example IV were combined with 54 parts of dibutyl phthalate, 45 parts of tolylene2,4-diisocyanate and 1 part of dibutyltin deacetate. The mixture was cured at 60°C for 40 hours to give a light colored, bubble-free rubbery resin with good elasticity.

I claim as my invention:

1. A highly unsaturated polyether having repeating units having the structure

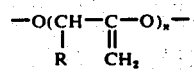

wherein R is a member of the group consisting of hydrogen and alkyl groups, and n is an integer greater than 2.

2. A polyhydroxy-substituted highly unsaturated polyether having the formula

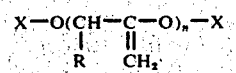

wherein X is a hydroxy-substituted alkyl radical containing 3 to 8 carbon atoms, and R is a member of the group consisting of hydrogen and alkyl radicals, and $n$ is an integer greater than 2.

3. A polymeric polyhydroxy-substituted highly unsaturated polyether having the formula

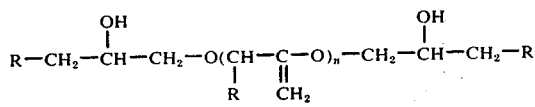

wherein R is a member of the group consisting of hydrogen and alkyl radicals and $n$ is an integer between 2 and 60.

4. A process for preparing hydroxy-substituted highly unsaturated polyethers comprising treating a polyepihalohydrin prepared in the presence of an OH-containing material and acidic catalyst, with methoxide or potassium t-butoxide in the presence of from about 2 to 10 times the weight of the polyepihalohydrin of dimethyl sulfoxide.

* * * * *